(12) United States Patent
Ikeda et al.

(10) Patent No.: US 12,011,787 B2
(45) Date of Patent: Jun. 18, 2024

(54) FLUX, SOLDER PASTE, AND ELECTRONIC CIRCUIT BOARD

(71) Applicant: Harima Chemicals, Incorporated, Kakogawa (JP)

(72) Inventors: Kazuki Ikeda, Kakogawa (JP); Syota Tanaka, Kakogawa (JP)

(73) Assignee: HARIMA CHEMICALS, INCORPORATED, Kakogawa (JP)

( * ) Notice: Subject to any disclaimer, the term of this patent is extended or adjusted under 35 U.S.C. 154(b) by 492 days.

(21) Appl. No.: 17/601,722

(22) PCT Filed: Mar. 26, 2020

(86) PCT No.: PCT/JP2020/013562
§ 371 (c)(1),
(2) Date: Oct. 6, 2021

(87) PCT Pub. No.: WO2020/209077
PCT Pub. Date: Oct. 15, 2020

(65) Prior Publication Data
US 2022/0193834 A1    Jun. 23, 2022

(30) Foreign Application Priority Data
Apr. 11, 2019  (JP) ................................ 2019-075715

(51) Int. Cl.
| B23K 35/362 | (2006.01) |
| B23K 1/00 | (2006.01) |
| B23K 1/20 | (2006.01) |
| B23K 35/26 | (2006.01) |
| B23K 101/42 | (2006.01) |
| B23K 103/08 | (2006.01) |

(52) U.S. Cl.
CPC .......... *B23K 35/362* (2013.01); *B23K 1/0008* (2013.01); *B23K 1/203* (2013.01); *B23K 35/262* (2013.01); *B23K 2101/42* (2018.08); *B23K 2103/08* (2018.08)

(58) Field of Classification Search
CPC .................................................. B23K 35/362
See application file for complete search history.

(56) References Cited

U.S. PATENT DOCUMENTS

| 10,857,630 B2 | 12/2020 | Takagi et al. | |
| 2019/0015937 A1* | 1/2019 | Nakaji | C08L 93/04 |

FOREIGN PATENT DOCUMENTS

| CN | 104070308 A | 10/2014 |
| JP | 2000135592 A | 5/2000 |
| JP | 2010-083844 A | 4/2010 |
| JP | 2014-117737 A | 6/2014 |
| JP | 2014188578 A | 10/2014 |
| JP | 2018083211 A * | 5/2018 |
| JP | 2018083211 A | 5/2018 |
| JP | 2018122324 A | 8/2018 |
| JP | 6460198 B1 | 1/2019 |
| JP | 2019018210 A | 2/2019 |

OTHER PUBLICATIONS

English machine translation of JP 2018-083211 A of Ikeda (Year: 2018).*
PCT International Preliminary Report on Patentability (form PCT/IB/373) issued Sep. 28, 2021, with PCT notification concerning transmittal of International Preliminary Report on Patentability (form PCT/IB/326), and PCT International Preliminary Report on Patentability ( form PCT/IB/373), with PCT notification of transmittal of translation of the International Preliminary Report on Patentability (form PCT/IB/338) for corresponding PCT/JP2020/013562 (10 pages).
Extended European Search Report issued on Mar. 27, 2023, by the European Patent Office in corresponding European Patent Application No. 20787871.1 (7 pages).
International Search Report (PCT/ISA/210) with an English translation, and Written Opinion (PCT/ISA/237) mailed on Jun. 16, 2020, by the Japanese Patent Office as the International Searching Authority for International Application No. PCT/JP2020/013562. (8 pages).
The First Office Action issued on Apr. 12, 2022, by the State Intellectual Property Office of the People's Republic of China in corresponding Chinese Patent Application No. 202080027830.7 and an English translation of the Action. (12 pages).

* cited by examiner

*Primary Examiner* — Jophy S. Koshy

(74) *Attorney, Agent, or Firm* — BUCHANAN, INGERSOLL & ROONEY PC

(57) ABSTRACT

A flux used for soldering with a tin-silver-copper alloy comprises an imidazole compound and/or an imidazoline compound; a dicarboxylic acid having 3 or more and 36 or less carbons; and a quaternary ammonium iodine salt. Relative to the total amount of the flux, the dicarboxylic acid content is 6 mass % or more and 25 mass % or less, and the iodine content is 200 ppm or more and 3600 ppm or less.

10 Claims, No Drawings

FLUX, SOLDER PASTE, AND ELECTRONIC CIRCUIT BOARD

TECHNICAL FIELD

The present invention relates to a flux, a solder paste, and an elegy electronic circuit board.

BACKGROUND ART

In metal connection in electrical and electronic devices, solder connection using a solder paste has been generally used, and in such a solder paste, a solder alloy containing lead and a flux have been conventionally contained.

However, in view of environmental load, recently, use of lead has been required to be suppressed and thus, the development of a solder alloy containing no lead (lead-free solder alloy) has been promoted. As such a lead-free solder alloy, for example, a tin-copper alloy, a tin-silver-copper alloy, a tin-silver-indium-bismuth alloy, a tin-bismuth alloy, and a tin-zinc alloy have been well known. Among all, tin-silver-copper alloys are widely used because of their excellent strength.

A flux used for the tin-silver-copper alloy is required to suppress the occurrence of a void (gap) in the solder portion. In light of the foregoing, for example, it has been proposed that, when a flux composition including (A) a base resin, (B) an activator, (C) a thixotropic agent, and (D) a solvent is produced, dicarboxylic acid is added as the activator (B) and the blending amount of the activator (B) to the total amount of the flux composition falls within 4.5 mass % or more and 35 mass % or less (for example, see Patent Document 1)

CITATION LIST

Patent Document

Patent Document 1: Japanese Unexamined Patent Publication No. 2018-122324

SUMMARY OF THE INVENTION

Problem to be Solved by the Invention

The flux composition is also required to suppress whiskers (crystal growth) in addition to the suppression of the occurrence of a void (gap) in the solder portion.

Furthermore, the flux composition is also required to improve its wettability.

In particular, a solder paste including the flux composition is continuously used for a portion to be soldered in some cases. Thus, the flux composition is required to maintain wettability during the continuous use and further required to maintain stability, for example, not to increase the viscosity during the continuous use.

The present invention provides: a solder paste that can provide excellent wettability, suppress the void (gap) and whiskers (crystal growth) in the solder portion, and further maintain excellent wettability and stability during the continuous use; a solder paste using the flux; and an electronic circuit board using the solder paste.

Means for Solving the Problem

The present invention [1] includes a flux for soldering with a tin-silver-copper alloy, the flux comprising: an imidazole compound and/or an imidazoline compound; a dicarboxylic acid having 3 or more and 36 or less carbons; and a quaternary ammonium iodine salt, wherein relative to the total amount of the flux, the dicarboxylic acid content is 6 mass % or more and 25 mass % or less, and the iodine content is 200 ppm or more and 3600 ppm or less.

The present invention [2] includes the flux described in [1] above, wherein the imidazole compound includes an imidazole compound having 2 or more aromatic rings.

The present invention [3] includes the flux described in [1] above, wherein the imidazoline compound includes an imidazoline compound having 1 or more aromatic ring(s).

The present invention [4] includes the flux described in any one of [1] to [3] above, wherein, relative to the total amount of the flux, the iodine content is 200 ppm or more and 2600 ppm or less.

The present invention [5] includes the flux described in any one of [1] to [4] above, wherein, relative to the total amount of the flux, the iodine content is 600 ppm or more and 1230 ppm or less.

The present invention [6] includes the flux described in any one of [1] to [5] above, wherein the dicarboxylic acid includes a dicarboxylic acid having 3 or more and 25 or less carbons and a dicarboxylic acid having 30 or more and 36 or less carbons, and relative to a total amount of the dicarboxylic acids, a ratio of the dicarboxylic acid having 30 or more and 36 or less carbons exceeds 50 mass %.

The present invention [7] includes the flux described in any one of [1] to [6] above, wherein the dicarboxylic acid includes a dicarboxylic acid having 10 or more and 25 or less carbons and a dicarboxylic acid having 30 or more and 36 or less carbons, and relative to a total amount of the dicarboxylic acids, a ratio of the dicarboxylic acid having 30 or more and 36 or less carbons exceeds 50 mass %.

The present invention [8] includes a solder paste comprising: the flux described in any one of [1] to [7] above; and a solder powder made of an tin-silver-copper solder alloy, wherein the tin-silver-copper solder alloy contains bismuth and antimony, relative to a total amount of the tin-silver-copper solder alloy, the bismuth content is 2.5 mass % or more, and the antimony content is 2.5 mass % or more.

The present invention [9] includes the solder paste described in [8] above, wherein the tin-silver-copper solder alloy consists of tin, silver, copper, bismuth, antimony, nickel, and cobalt, and is allowed to contain inevitable impurities, relative to a total amount of the tin-silver-copper solder alloy, the silver content is 2.8 mass % or more and 4 mass % or less,
the copper content is 0.4 mass % or more and 0.8 mass % or less, the antimony content is 2.5 mass % or more and 7 mass % or less, the bismuth content is 2.5 mass % or more and 5.5 mass % or less, the nickel content is 0.01 mass % or more and 0.2 mass % or less, and the cobalt content is 0.001 mass % or more and 0.1 mass % or less.

The present invention [10] includes an electronic circuit board comprising a solder portion soldered with the solder paste described in [8] or [9] above.

Effects of the Invention

The flux of the present invention contains an imidazole compound and/or an imidazoline compound, a dicarboxylic acid having 3 or more and 36 or less carbons, and a quaternary ammonium iodine salt. Further, the dicarboxylic acid content and the iodine salt content are each adjusted in a predetermined range.

Thus, using the above-described flux and a solder paste containing the flux can provide excellent wettability, can suppress a void (gap) in the solder portion, further can suppress whiskers (crystal growth). In addition, excellent wettability and stability are maintained during the continuous use.

The electronic circuit board of the present invention is soldered with excellent wettability while a void (gap) and whiskers (crystal growth) can be suppressed. This is because the above-described solder paste is used for the soldering. Further, the above-described solder paste maintains excellent wettability and stability during the continuous use. Thus, the electronic circuit board of the present invention is excellent in productivity.

DESCRIPTION OF THE EMBODIMENTS

The flux of the present invention is a flux used for soldering with a tin-silver-copper alloy.

The flux usually contains a base resin and a thixotropic agent as its main components.

Examples of the base resin include acrylic resin, styrene-maleic acid resin, epoxy resin, urethane resin, polyester resin, phenoxy resin, terpene resin, and rosin-based resin. Examples of the rosin-based resin include gum rosin, toll rosin, wood rosin, and derivatives thereof. Examples of the derivatives thereof include polymerized rosin, acrylated rosin, hydrogenated rosin, disproportionated rosin, formylated rosin, rosin ester, rosin-modified maleic acid resin, rosin-modified phenol resin, and rosin-modified alkyd resin.

The base resins can be used singly or can be used in combination of two or more.

As the base resin, preferably, acrylic resin, and rosin-based resin are used, more preferably, acrylic resin and rosin-based resin are used in combination. As the rosin-based resin, preferably, acrylated rosin is used.

As the base resin, particularly preferably, acrylic resin and acrylated rosin are used in combination.

The content of the base resin relative to the total amount of the flux is, for example, more than 0 mass %, preferably, 5 mass % or more, more preferably, 25 mass % or more, even more preferably, 35 mass % or more and, for example, 90 mass % or less, preferably, 80 mass % or less, more preferably, 60 mass % or less.

When an acrylic resin and a rosin-based resin are used in combination as the base resin, the content of the acrylic resin relative to the total amount of the flux is, for example, more than 0 mass %, preferably, 20 mass % or more and, for example, 60 mass % or less, preferably, 50 mass % or less.

The content of the rosin-based resin relative to the total amount of the flux is, for example, more than 0 mass %, preferably, 5 mass % or more and, for example, 50 mass % or less, preferably, 30 mass % or less, more preferably, 15 mass % or less.

When an acrylic resin and a rosin-based resin are used in combination, relative to the total amount of the acrylic resin and rosin-based resin, the mass ratio of the acrylic resin is, for example, 50 mass % or more, preferably, 60 mass % or more and, for example, 95 mass % or less, preferably, 85 mass % or less. Meanwhile, the mass ratio of the rosin-based resin is, for example, 5 mass % or more, preferably, 15 mass % or more and, for example, 50 mass % or less, preferably, 40 mass % or less.

Examples of the thixotropic agent include hardened castor oil, bees wax, carnauba wax, and bisamide wax (such as stearic acid amide, methylene bis stearic acid amide, and ethylene bis hydroxy stearic acid amide).

The thixotropic agent can be used singly or can be used in combination of two or more.

As the thixotropic agent, preferably, bisamide wax is used.

The content of the thixotropic agent relative to the total amount of the flux is, for example, more than 0 mass %, preferably, 1 mass % or more, more preferably, 2 mass % or more and, for example, 13 mass % or less, preferably, 8 mass % or less, more preferably, 5 mass % or less.

The content of the thixotropic agent relative to 100 parts by mass of the base resin is, for example, 1 parts by mass or more, preferably, 3 parts by mass or more and, for example, 15 parts by mass or less, preferably, 10 parts by mass or less.

The flux contains the imidazole compound and/or imidazoline compound, dicarboxylic acid having 3 or more and 36 or less carbons, and quaternary ammonium iodine salt as essential additives.

The imidazole compound and/or imidazoline compound are/is added as a void suppressing agent to the flux.

The imidazole compound is an organic compound having 1 or more imidazole ring(s) in its molecule.

The number of the imidazole rings is not especially limited. However, the number is 1 or more and, for example, 3 or less, preferably, 2 or less, particularly preferably, 1. In other words, as the imidazole compound, preferably, an organic compound having one imidazole ring in its molecule is used.

Examples of the imidazole compound include an imidazole compound without an aromatic ring, and an imidazole compound having an aromatic ring.

The aromatic ring means a ring having an aromatic property. That is, the aromatic ring means a ring having (4n+2) π electrons (n is a natural number) and includes both of an aromatic hydrocarbon without a heteroatom and a heterocyclic aromatic ring containing a heteroatom.

Specific examples of the aromatic ring include: monocyclic or polycyclic aromatic hydrocarbons each having 6 or more and 14 or less carbons such as a benzene ring, a naphthalene ring, an indene ring, an azulene ring, a fluorene ring, an anthracene ring, and a phenanthrene ring; and heterocyclic aromatic rings such as a pyridine ring, a pyrrole ring, and a furan ring. The aromatic rings can be used singly or can be used in combination of two or more.

The imidazole compound without an aromatic ring does not contain an aromatic ring but an imidazole ring. Examples of the imidazole compound without an aromatic ring include imidazole (1,3-diaza-2,4-cyclopentadiene), 2-methylimidazole, 2-undecylimidazole, 2-heptadecylimidazole, 1,2-dimethylimidazole, 2-ethyl-4-methylimidazole, 1-cyanoethyl-2-methylimidazole, 1-cyanoethyl-2-undecylimidazole, and 1-cyanoethyl-2-ethyl-4-methylimidazole. These can be used singly or can be used in combination of two or more.

The imidazole compound having an aromatic ring is an imidazole derivative containing 1 or more aromatic ring(s) separately from an imidazole ring (namely, an imidazole compound having 1 or more aromatic ring(s)).

Examples of the imidazole compound having an aromatic ring include an imidazole compound one (single) aromatic ring, and an imidazole compound having two or more (a plurality of) aromatic rings.

Examples of the imidazole compound having one aromatic ring include 2-phenylimidazole, 2-phenyl-4-methylimidazole, 1-benzyl-2-methylimidazole, and 1-cyanoethyl-2-phenylimidazole. These can be used singly or can be used in combination of two or more.

Examples of the imidazole compound having two or more aromatic rings include: imidazoles each having two aromatic rings such as 1-benzyl-2-phenylimidazole, 2,4-diphenylimidazole, 4,5-diphenylimidazole; and imidazoles each having three aromatic rings such as 2,4,5-triphenylimidazole, and 1-triphenylmethylimidazole. These can be used singly or can be used in combination of two or more.

The imidazole compounds can be used singly or can be used in combination of two or more.

To improve wettability and suppress a void, as the imidazole compound, preferably, an imidazole having an aromatic ring is used. More preferably, an imidazole compound having two or more (a plurality of) aromatic rings is used. Even more preferably, an imidazole compound having two aromatic rings is used. Particularly preferably, 1-benzyl-2-phenylimidazole is used.

The imidazoline compound is an organic compound having 1 or more imidazoline ring(s) in its molecule.

The number of the imidazoline rings is not especially limited. However, the number is 1 or more and, for example, 3 or less, preferably, 2 or less, particularly preferably, 1. In other words, as the imidazoline compound, preferably, an organic compound having one imidazoline ring in its molecule is used.

Examples of the imidazoline compound include an imidazoline compound without an aromatic ring, and an imidazoline compound having an aromatic ring.

Examples of the imidazoline compound without an aromatic ring include imidazoline (4,5-dihydro-1H-imidazole), 2-methylimidazoline, 2-undecylimidazoline, 2-heptadecylimidazoline, 1,2-dimethylimidazoline, 2-ethyl-4-methylimidazoline, 1-cyanoethyl-2-methylimidazoline, 1-cyanoethyl-2-undecylimidazoline, and 1-cyanoethyl-2-ethyl-4-methylimidazoline. These can be used singly or can be used in combination of two or more.

The imidazoline compound having an aromatic ring is an imidazoline derivative having 1 or more aromatic ring(s) separately from an imidazoline ring (namely, an imidazoline compound having 1 or more aromatic ring).

Examples of the imidazoline compound having an aromatic ring include an imidazoline compound having one (single) aromatic ring, and an imidazoline compound having 2 or more (a plurality of) aromatic rings.

Examples of the imidazoline compound having one aromatic ring include 2-phenylimidazoline, 2-phenyl-4-methylimidazoline, 1-benzyl-2-methylimidazoline, and 1-cyanoethyl-2-phenylimidazoline. These can be used singly or can be used in combination of two or more.

Examples of the imidazoline compound having 2 or more aromatic rings include: imidazolines each having two aromatic rings such as 1-benzyl-2-phenylimidazoline, 2,4-diphenylimidazoline, and 4,5-diphenylimidazoline; and imidazolines each having three aromatic rings such as 2,4,5-triphenylimidazoline, and 1-triphenylmethylimidazoline. These can be used singly or can be used in combination of two or more.

The imidazoline compounds can be used singly or can be used in combination of two or more.

To improve wettability and suppress a void, as the imidazoline compound, preferably, an imidazoline having 1 or more aromatic ring(s) is used. More preferably, an imidazoline having one (single) aromatic ring is used. Even more preferably, 2-phenylimidazoline is used.

To improve wettability and suppress a void, as the imidazole compound and/or imidazoline compound, preferably, a combination thereof is used. More preferably, a combination of the imidazole compound having 2 or more aromatic rings and the imidazoline compound having 1 or more aromatic ring(s) is used. Even more preferably, a combination of the imidazole compound having two aromatic rings and the imidazoline compound having one aromatic ring is used. Particularly preferably, a combination of 1-benzyl-2-phenylimidazole and 2-phenylimidazoline is used.

The content of the imidazole compound and/or imidazoline compound (the total amount if a combination thereof is used) relative to the total amount of the flux is, for example, 0.1 mass % or more, preferably, 0.3 mass % or more and, for example, 10 mass % or less, preferably, 7 mass % or less, more preferably, 5 mass % or less.

When a combination of the imidazole compound and imidazoline compound is used, relative to the total amount thereof, the mass ratio of the imidazole compound is, for example, 20 mass % or more, preferably, 30 mass % or more and, for example, 80 mass % or less, preferably, 70 mass % or less. Meanwhile, the mass ratio of the imidazoline compound is for example, 20 mass % or more, preferably, 30 mass % or more and, for example, 80 mass % or less, preferably, 70 mass % or less.

The content of the imidazole compound and/or the imidazoline compound relative to 100 parts by mass of the base resin is, for example, 1 parts by mass or more, preferably, 3 parts by mass or more and, for example, 15 parts by mass or less, preferably, 10 parts by mass or less.

The dicarboxylic acid (C) having 3 or more and 36 or less carbons is added as the activator to the flux.

Examples of the dicarboxylic acid (C) having 3 or more and 36 or less carbons include: saturated aliphatic dicarboxylic acids each having C3-36 such as malonic acid (C3), succinic acid (C4), glutaric acid (C5), adipic acid (C6), pimelic acid (C7), suberic acid (C8), azelaic acid (C9), sebacic acid (C10), undecanedioic acid (C11), dodecanedioic acid (C12), tetradecanedioic acid (C14), hexadecanedioic acid (C16), octadecanedioic acid (C18), eicosanedioic acid (C20), tetracosanedioic acid (C24), and hydrogenated dimer acid (C36); unsaturated aliphatic dicarboxylic acids each having C3-36 such as maleic acid (C4), fumaric acid (C4), itaconic acid (C5), and dimer acid (C36); aromatic dicarboxylic acids each having C3-36 such as phthalic acid (C8), isophthalic acid (C8), terephthalic acid (C8), and toluenedicarboxylic acid (C9); and hydroxy group-containing dicarboxylic acids such as malic acid (C4). These can be used singly or can be used in combination of two or more.

The dicarboxylic acid preferably includes a dicarboxylic acid having 26 or more and 36 or less carbons, more preferably, includes a dicarboxylic acid having 30 or more and 36 or less carbons, even more preferably, includes a dicarboxylic acid having 32 or more and 36 or less carbons and, particularly preferably, includes dimer acid.

Any one of the above-described dicarboxylic acids may singly be used as the dicarboxylic acid. However, preferably, two or more of the dicarboxylic acids are used in combination. More specifically, the dicarboxylic acid preferably includes a dicarboxylic acid having 30 or more and 36 or less carbons and the other dicarboxylic acid(s).

More specifically, the dicarboxylic acid preferably includes a dicarboxylic acid having 3 or more and 25 or less carbons and a dicarboxylic acid having 30 or more and 36 or less carbons, more preferably, includes a dicarboxylic acid having 8 or more carbons and 25 or less and a dicarboxylic acid having 30 or more and 36 or less carbons and, even more preferably, includes a dicarboxylic acid having 10 or more and 25 or less carbons and a dicarboxylic acid having 30 or more and 36 or less carbons.

The dicarboxylic acid, even more preferably, consists of a dicarboxylic acid having 3 or more and 25 or less carbons and a dicarboxylic acid having 30 or more and 36 or less carbons, even more preferably, consists of a dicarboxylic acid having 8 or more and 25 or less carbons and a dicarboxylic acid having 30 or more and 36 or less carbons and, particularly preferably, consists of a dicarboxylic acid having 10 or more and 25 or less carbons and a dicarboxylic acid having 30 or more and 36 or less carbons.

In such a case, the ratio of the dicarboxylic acid having 30 or more and 36 or less carbons to the total amount of the dicarboxylic acid is, for example, 30 mass % or more, preferably, 50 mass % or more, more preferably, more than 50 mass %, even more preferably, 55 mass % or more and, for example, 100 mass % or less, preferably, 90 mass % or less, more preferably, 80 mass % or less, even more preferably, 70 mass % or less.

When the ratio of the dicarboxylic acid having 30 or more and 36 or less carbons is within the above-described range, excellent wettability can be obtained, and a void (gap) and, further, whiskers (crystal growth) in the solder portion can be suppressed.

The ratio of the other dicarboxylic acid (for example, a dicarboxylic acid having 3 or more and 25 or less carbons, preferably, a dicarboxylic acid having 8 or more and 25 or less carbons, or more preferably, a dicarboxylic acid having 10 or more and 25 or less carbons) to the total amount of the dicarboxylic acids is, for example, 0 mass % or more, preferably, 10 mass % or more, more preferably, 20 mass % or more, even more preferably, 30 mass % or more and, for example, 70 mass % or less, preferably, 50 mass % or less, more preferably, less than 50 mass %, even more preferably, 45 mass % or less.

When the ratio of the other dicarboxylic acid is within the above-described range, excellent wettability can be obtained, a void (gap) and, further, whiskers (crystal growth) in the solder portion can be suppressed.

The content of the dicarboxylic acid (the total amount of the dicarboxylic acids when being used in combination) to the total amount of the flux is 6 mass % or more, preferably, 8 mass % or more, more preferably, 10 mass % or more, particularly preferably, 12 mass % or more and, 25 mass % or less, preferably, 23 mass % or less, more preferably, 21 mass % or less, even more preferably, 19 mass % or less.

When the ratio of the dicarboxylic acid(s) is within the above-described range, excellent wettability can be obtained, and a void (gap) in the solder portion can be suppressed.

The content of the dicarboxylic acid relative to 100 parts by mass of the base resin is, for example, 20 parts by mass or more, preferably, 30 parts by mass or more and, for example, 70 parts by mass or less, preferably, 60 parts by mass or less.

The quaternary ammonium iodine salt is added as a wettability improving agent to the flux.

Examples of the quaternary ammonium include tetraalkylammonium. Examples of the iodine salt include monoiodide, and trihalide having 1 or more iodine(s).

More specific examples of the quaternary ammonium iodine salt include tetraalkylammonium monoiodides such as tetramethylammonium iodide, tetraethylammonium iodide, tetrapropylammonium iodide, tetrabutylammonium iodide, tetrapentylammonium iodide, tetrahexylammonium iodide, tetraheptylammonium iodide, ethyltripropylammonium iodide, trimethylbenzylammonium iodide, triethylbenzylammonium iodide, and lepidine isoamyl iodide. The specific examples further include trihalides of tetraalkylammonium (trihalides having 1 or more iodine(s)) such as tetrabutylammonium triiodide, tetrabutylammonium bromodiiodide, and tetrabutylammonium dibromoiodide. These can be used singly or can be used in combination of two or more.

As the quaternary ammonium iodine salt, preferably, tetraalkylammonium monoiodide is used and, more preferably, tetrabutylammonium iodide is used.

The content of the quaternary ammonium iodine salt in the flux is appropriately adjusted so that the ratio of iodine (iodine atoms) to the total amount of the flux falls within a predetermined range.

More specifically, the content of the iodine relative to the total amount of the flux is 200 ppm or more, preferably, 600 ppm or more, more preferably, 800 ppm or more and, 3600 ppm or less, preferably, 2600 ppm or less, more preferably, 1230 ppm or less.

When the content of the iodine is within the above-described range, excellent wettability can be obtained, further, whiskers (crystal growth) in the solder portion can be suppressed. Furthermore, excellent wettability and stability can be maintained during the continuous use.

The flux can contain an organic solvent as an optional component, if needed.

Examples of the organic solvent include alcoholic solvents (such as ethyl alcohol, isopropyl alcohol, ethylcellosolve, butyl carbitol, and hexyl carbitol), ester solvents (such as ethyl acetate, and butyl acetate), and hydrocarbon solvents (such as toluene, and turpentine oil).

The organic solvents can be used singly or can be used in combination of two or more.

Examples of the organic solvent, preferably, include isopropyl alcohol, butyl carbitol, and hexyl carbitol, more preferably, include butyl carbitol, and hexyl carbitol and, even more preferably, include hexyl carbitol.

The content of the organic solvent relative to the total amount of the flux is, for example, more than 0 mass %, preferably, 10 mass % or more and, for example, 50 mass % or less, preferably, 40 mass % or less, more preferably, 35 mass % or less.

The content of the organic solvent relative to 100 parts by mass of the base resin is, for example, 30 parts by mass or more, preferably, 40 parts by mass or more, more preferably, 50 parts by mass or more, even more preferably, 60 parts by mass or more and, for example, 90 parts by mass or less, preferably, 80 parts by mass or less, more preferably, 70 parts by mass or less.

The flux can contain a known additive as an optional component, if needed.

Examples of the additive include an antioxidant, a chelating agent, an antirust agent, and an activator other than the above-described dicarboxylic acids. The additives can be used singly or can be used in combination of two or more. The content of the additive is not especially limited, and appropriately set in a range in which the additive does not inhibit the effects of the present invention, according to the purpose and use.

The above-described components are mixed at the above-described ratios, thereby producing the flux.

The flux contains the imidazole compound and/or imidazoline compound, dicarboxylic acid having 3 or more and 36 or less carbons, and quaternary ammonium iodine salt. The content of the dicarboxylic acid and the content of the iodine salt are each adjusted in a predetermined range.

Thus, the above-described flux can provide excellent wettability, and suppress a void (gap) and whiskers (crystal growth) in the solder portion. In addition, the above-described flux can provide excellent wettability and stability during the continuous use.

In particular, when a solder alloy described below containing Sb and Bi at the ratios described below is used, the alloy has relatively high oxidizability and easily forms an oxidized film. Thus, in some cases, the wettability drastically decreases during soldering, or a void (gap) or whiskers (crystal growth) occurs in the solder portion.

Contrarily to the above, the above-described flux can provide excellent wettability, and suppress a void (gap) and whiskers (crystal growth) in the solder portion even when such a highly oxdizable solder alloy containing Sb and Bi is used.

Thus, the above-described flux is suitably used for the solder paste used for soldering with a tin-silver-copper alloy.

The solder paste contains: a solder powder made of a tin-silver-copper solder alloy; and the above-described flux.

The tin-silver-copper solder alloy is a solder alloy containing tin (Sn), silver (Ag), and copper (Cu) as its essential components. The tin-silver-copper solder alloy can contain various additive elements such as bismuth (Bi), antimony (Sb), indium (In), cobalt (Co), and nickel (Ni) at appropriate ratios.

The content of each element in the tin-silver-copper solder alloy is appropriately set, for example, depending on the desired properties.

For example, in view of the adhesion, the tin-silver-copper solder alloy preferably contains antimony (Sb) and bismuth (Bi).

In other words, the tin-silver-copper solder alloy preferably contains tin (Sn), silver (Ag), copper (Cu), antimony (Sb), and bismuth (Bi).

The content of tin in the tin-silver-copper solder alloy (hereinafter, may merely be called the solder alloy) is the remaining ratio to the components described below, and appropriately set depending on the blending amount of each of the components.

The content of silver relative to the total amount of the solder alloy is, for example, 2.8 mass % or more, preferably, 3 mass % or more, more preferably, 3.2 mass % or more, even more preferably, 3.4 mass % or more and, for example, 4 mass % or less, preferably, 3.8 mass % or less, more preferably, 3.6 mass % or less.

When the content of silver is within the above-described range, excellent impact resistance can be obtained, and the excellent impact resistance can be maintained even when the solder alloy is exposed to a relatively severe temperature cycling condition.

The content of copper relative to the total amount of the solder alloy is, for example, 0.4 mass % or more, preferably, 0.5 mass % or more, more preferably, 0.6 mass % or more and, for example, 0.8 mass % or less, preferably, 0.78 mass % or less, more preferably, 0.75 mass % or less.

When the content of copper is within the above-described range, excellent impact resistance can be obtained, and the excellent impact resistance can be maintained even when the solder alloy is exposed to a relatively severe temperature cycling condition.

The content of antimony relative to the total amount of the solder alloy is, for example, 2.5 mass % or more, preferably, 3.5 mass % or more, more preferably, 4.5 mass % or more and, for example, 7 mass % or less, preferably, 6.5 mass % or less, more preferably, 6 mass % or less.

When the content of antimony is within the above-described range, excellent impact resistance can be obtained, and the excellent impact resistance can be maintained even when the solder alloy is exposed to a relatively severe temperature cycling condition.

The content of bismuth relative to the total amount of the solder alloy is, for example, 2.5 mass % or more, preferably, 3.5 mass % or more, more preferably, 4.5 mass % or more and, for example, 5.5 mass % or less, preferably, 5.3 mass % or less, more preferably, 5.1 mass % or less.

When the content of bismuth is within the above-described range, excellent impact resistance can be obtained, and the excellent impact resistance can be maintained even when the solder alloy is exposed to a relatively severe temperature cycling condition.

In the solder alloy, the sum of the content of antimony and the content of bismuth is, 5.0 mass % or more, preferably, 7.0 mass % or more, more preferably, 9.0 mass % or more and, for example, 12.5 mass % or less, preferably, 12.0 mass % or less, more preferably, 11.0 mass % or less.

When the sum of the content of antimony and the content of bismuth is within the above-described range, excellent impact resistance can be obtained, and the adhesive strength can be maintained even under a relatively severe temperature cycling condition.

The above-described tin-silver-copper solder alloy can further contain, for example, nickel (Ni), and cobalt (Co).

Preferably, the tin-silver-copper solder alloy contains tin (Sn), silver (Ag), copper (Cu), bismuth (Bi), antimony (Sb), nickel (Ni), and cobalt (Co) as its essential components.

More preferably, the tin-silver-copper solder alloy essentially consists of tin (Sn), silver (Ag), copper (Cu), antimony (Sb), bismuth (Bi), nickel (Ni), and cobalt (Co).

The "essentially" means that the tin-silver-copper solder alloy contains the above-described elements (tin, silver, copper, antimony, bismuth, nickel, and cobalt) as its essential components, and is allowed to contain inevitable impurities described below.

In other words, the tin-silver-copper solder alloy consists of the above-described elements (tin, silver, copper, antimony, bismuth, nickel, and cobalt), or consists of the above-described elements (tin, silver, copper, antimony, bismuth, nickel, and cobalt) and inevitable impurities.

The content of nickel relative to the total amount of the solder alloy is, for example, 0.01 mass % or more, preferably, 0.02 mass % or more, more preferably, 0.03 mass % or more and, for example, 0.2 mass % or less, preferably, 0.1 mass % or less, more preferably, 0.08 mass % or less.

When the content of nickel is within the above-described range, the tissues of the solder can be finer, and thus crack resistance, and durability can be improved. Further, corrosion resistance can be improved, and destruction of the parts can be suppressed.

The content of cobalt relative to the total amount of the solder alloy is, for example, 0.001 mass % or more, preferably, 0.003 mass % or more, more preferably, 0.004 mass % or more and, for example, 0.1 mass % or less, preferably, 0.05 mass % or less, more preferably, 0.01 mass % or less.

When the solder alloy contains cobalt, an intermetallic compound layer (for example, Sn—Cu, Sn—Co, or Sn—Cu—Co) formed on the soldering interface is thickened in the solder paste made of the solder alloy. Thus, the solder alloy does not easily grow even with the load from heat or the load from heat change. Further, the dispersion and precipitation of the cobalt in the solder can strengthen the solder. When the solder alloy contains cobalt at the above-described ratio, the tissues of the solder can be finer. Thus, excellent crack resistance can be obtained and durability can be improved. In addition, excellent corrosion resistance can be obtained and destruction of the parts can be suppressed.

The solder alloy can be produced by alloying by a known method, for example, melting and homogenizing the above-described metal components in a melting furnace.

Each of the above-described metal components used to produce the solder alloy may contain a trace quantity of impurities (inevitable impurities) in a range in which the impurities do not inhibit the effects of the present invention.

The inevitable impurities are components other than the above-described elements. Examples of the inevitable impurities include aluminum (Al), iron (Fe), zinc (Zn), gold (Au), and indium (In).

The ratio of the inevitable impurities to the total amount of the solder alloy is, for example, 0.05 mass % or less, preferably, 0.01 mass % or less, more preferably, 0.001 mass % or less.

The solder alloy produced in this manner has a melting point of, for example, 200° C. or more, preferably, 210° C. or more and, for example, less than 240° C., preferably, 230° C. or less, more preferably, 225° C. or less when the melting point is measured by a DSC method (measurement conditions: at the rate of temperature increase 0.5° C./min).

As long as the melting point of the solder alloy is within the above-described range, the metal connection using the solder paste containing the solder alloy can be carried out in a simple and effective way, and damage to the member to be soldered can be suppressed.

The solder alloy is preferably contained as a powder in the solder paste.

The shape of the powder is not especially limited. Examples thereof include a substantially perfect spherical shape, a flat block shape, and an acicular shape, or the powder may have an amorphous shape. The shape of the powder is appropriately set according to the required quality (for example, thixotropy or viscosity) of the solder paste.

The powder of the solder alloy has an average particle diameter (when being spherical), or an average longitudinal length (when not being spherical) of, for example, 5 μm or more, preferably, 10 μm or more, for example, 100 μm or less, preferably, 50 μm or less in the measurement using a laser diffraction particle size distribution analyzer.

The solder paste can be produced by, for example, mixing the powder made of the above-described solder alloy with the above-described flux.

To 100 parts by mass of the total amount of the solder alloy and flux, the blending ratio of the solder alloy is, for example, 70 parts by mass or more and, for example, 95 parts by mass or less, preferably, 90 parts by mass or less. Meanwhile, the blending ratio of the flux is, for example, 5 parts by mass or more, preferably, 10 parts by mass or more and, for example, 30 parts by mass or less.

The method of mixing the solder alloy and flux is not especially limited and a known method is used.

The solder paste produced in this manner contains the above-described flux. Thus, excellent wettability can be obtained and a void (gap) in the solder portion can be suppressed. Further, whiskers (crystal growth) can be suppressed. Furthermore, wettability and stability are excellent during the continuous use.

In particular, when an alloy like the above-described solder alloy containing Sb and Bi at the above-described ratios is used, the alloy has relatively high oxidizability and an oxidized film is easily formed. Thus, in the soldering in some cases, the wettability (particularly, wettability during the continuous use) drastically decreases, or a noticeable void (gap) or whiskers (crystal growth) occurs in the solder portion. In particular, when the decrease in wettability during the continuous use is required, and additionally the viscosity during the continuous use increases, stability becomes insufficient in some cases.

Contrarily to the above, the above-described flux can provide excellent wettability, suppress a void (gap) and whiskers (crystal growth) in the solder portion, and can further provide excellent wettability and stability during the continuous use even when a highly oxidizable solder alloy containing Sb and Bi is used.

Further, the present invention includes an electronic circuit board including a solder portion soldered with the above-described solder paste.

In other words, the above-described solder paste is suitably used for soldering (metal connection of), for example, an electrode of a printed circuit board in an electrical or electronic device to an electronic component.

In other words, the electronic circuit board includes: a printed circuit board having an electrode; an electronic component; and a solder portion metallically connects the electrode to the electronic component. The solder portion is formed by the reflow soldering of the above-described solder paste.

The electronic component is not especially limited. Examples thereof include known electronic components such as a chip component (such as an IC chip), a resistance unit, a diode, a capacitor, and a transistor.

In soldering, the solder paste is applied on the board, for example, with a dispenser or by screen printing, and thereafter is pre-heated at approximately 150-200° C. and reflows at a maximum temperature of approximately 220-250° C.

The atmosphere condition for the application and reflow may be a normal air atmosphere or an inert atmosphere, for example, of nitrogen, argon, or helium.

In this manner, the electronic circuit board including the solder portion soldered with the above-described solder paste is produced.

Because the above-described solder paste is used for the soldering, the electronic circuit board is soldered with excellent wettability and a void (gap) and whiskers (crystal growth) are suppressed. Further, the above-described solder paste maintains excellent wettability and stability during the continuous use. Thus, the above-described electronic circuit board is excellent in productivity.

EXAMPLES

The present invention will be described based on Examples and Comparison Examples. The present invention, however, is not limited to Examples described below. The "parts" and "%" are based on mass unless otherwise specified. The specific numeral values used in the description below, such as mixing ratios (contents), physical property values, and parameters can be replaced with the corresponding mixing ratios (contents), physical property values, and parameters in the above-described "DESCRIPTION OF EMBODIMENTS", including the upper limit values (numeral values defined with "or less", and "less than") or the lower limit values (numeral values defined with "or more", and "more than").

Examples 1-10 and Comparative Examples 1-8

Preparation of Solder Alloy

Metal powders, namely, 3.5 mass % of Ag, 0.7 mass % of Cu, 5.0 mass % of Bi, 5.0 mass % of Sb, 0.05 mass % of Ni, 0.005 mass % of Co, and the balance of Sn were mixed. The obtained metal mixture was molten and homogenized in a melting furnace, thereby preparing a solder alloy.

Preparation of Flux

At each ratio shown in Table 1 to Table 3, a base resin, a thixotropic agent, a dicarboxylic acid, a quaternary ammonium iodine salt (or a bromine compound), a imidazole compound and an imidazoline compound, and an organic solvent were mixed, thereby producing a flux.

Preparation of Solder Paste

The produced solder alloy was powdered so that its particle size was 25 to 38 μm, and 90 parts by mass of the obtained powder of the solder alloy and 10 parts by mass of the flux obtained in the above preparation were mixed, thereby producing a solder paste.

Preparation of Electronic Circuit Board

The solder paste obtained in each of Examples and Comparative Examples was printed on a printed circuit board for mounting a chip component. Then, the chip component, a tantalum capacitor component, and a package (QFP: Quad Flat Package) component were mounted thereon by a reflowing method. The solder paste was printed using a metal mask with a thickness of 120 μm to adjust its printed thickness. After the solder paste was printed, a chip component of a size 2012 (2.0 mm×1.2 mm), a tantalum capacitor component with a size 6032 (6.0 mm×3.2 mm), and a QFP component with a pitch of 0.5 mm and deteriorated at 85° C., a relative humidity (RH) 85% for 24 hours were mounted on predetermined positions on the printed circuit board, and heated in a reflow oven, thereby mounting the chip component. The reflow conditions were set as follows: preheating of 170 to 190° C., peak temperature of 245° C., the time the temperature is 220° C. or more is 45 seconds, cooling speed at the time of decreasing temperature from the peak temperature to 200° C. is 3 to 8° C./sec.

<Evaluation>

(1) Wettability

On the printed circuit board obtained in each of Examples and Comparative Examples, the wettability was evaluated by observing the height to which the solder wetted and spread over the edge surface of the QFP land.

Specifically, the wetting height onto the land was evaluated on a 5-point scale by the following criteria. The results are shown in the tables. The wettability was evaluated by the proportion of the wetting height to the height of the top surface of the edge of the QFP lead given as 100%.

5 points: the wetting height was 100%
4 points: the wetting height was less than 100% and 75% or more
3 points: the wetting height was less than 75% and 50% or more
2 points: the wetting height was less than 50% and 25% or more
1 point: the wetting height was less than 25%

(2) Whisker

The printed circuit board obtained in each of Examples and Comparative Examples was left in a constant temperature (85° C.) and constant moisture (85% RH) bath for 200 hours. Next, an operation in which the printed circuit board was left at 25° C. and 50% RH for 24 hours was given as one cycle, and 5 cycles were repeated. Thereafter, a whisker generated from the tantalum capacitor component was observed to evaluate it by the following criteria. The results are shown in the tables.

Good: A whisker with a size of 10 μm or more did not occur.
Bad: A whisker with a size of 10 μm or more occurred.

(3) Void

After the printed circuit board obtained in each of Examples and Comparative Examples was cooled down, the chip component with a size 2012 on the printed circuit board was observed with X-ray photography to measure the ratio (the percentage of the area of the voids) of the total area of the voids to the region where the solder was formed. The void formation was evaluated by the following criteria, by calculating the average percentage of the areas of the voids in 20 lands on the printed circuit board. The results are shown in the table.

Good: the average percentage of the areas of the voids was 5% or less
Bad: the average percentage of the areas of the voids exceeded 5%

(4) Wettability During the Continuous Use

The solder paste obtained in each of Examples and Comparative Examples was rolled on a metal mask without an opening for 4 hours.

After the 4-hour rolling, the solder paste was printed on the printed circuit board, and a BGA (Ball Grid Array) component with a pitch of 0.8 mm was mounted thereon, and heated in a reflow oven. The reflow conditions were set as follows: preheating of 170 to 190° C., peak temperature of 245° C., the time the temperature is 220° C. or more is 45 seconds, cooling speed at the time of decreasing temperature from the peak temperature to 200° C. is 3 to 8° C./sec.

Then, the wettability of the BGA during the continuous use was evaluated by the following criteria. The results are shown in the tables.

Good: non-wetting did not occur
Bad: non-wetting occurred (5) Stability During the Continuous Use The solder paste obtained in each of Examples and Comparative Examples was rolled on a metal mask without an opening for 4 hours.

Before and after the rolling, the viscosity of the solder paste was measured in conformity with JIS Z 3284-3 (2014) using a spiral-pump type viscometer PCU-205 manufactured by Malcom Co., Ltd. under the conditions of 25° C.

The increase in viscosity (Pa·s) after the rolling in comparison with the viscosity before the rolling was calculated to evaluate the stability during the continuous use by the following criteria. The results are shown in the tables.

5 points: the increase in viscosity was 30 Pa·s or less
4 points: the increase in viscosity was 31 Pa·s or more and 60 Pa·s or less
3 points: the increase in viscosity was 61 Pa·s or more and 100 Pa·s or less
2 points: the increase in viscosity was 101 Pa·s or more
1 point: unmeasurable viscosity

TABLE 1

|  |  |  | Example1 | Example2 | Example3 | Example4 | Example5 |
|---|---|---|---|---|---|---|---|
| Formulation (parts by mass) | Base resin | Acrylic resin | 35 | 35 | 35 | 35 | 35 |
|  |  | Rosin-based resin | 10 | 10 | 10 | 10 | 10 |
|  | Dicarboxylic acid | Glutaric acid(C5) | 5 | — | 5 | — | 5 |
|  |  | Suberic acid(C8) | 1.5 | 1.5 | 1.5 | 1.5 | 1.5 |
|  |  | Dimer acid(C36) | 12 | 12 | 12 | 12 | 12 |
|  |  | Dodecanedioic acid(C12) | — | 5 | — | 5 | — |

TABLE 1-continued

|  |  |  | Example1 | Example2 | Example3 | Example4 | Example5 |
|---|---|---|---|---|---|---|---|
|  | Quaternary ammonium iodine salt | Tetrabutylammonium iodide | 0.26 | 0.26 | 0.83 | 0.83 | 1.02 |
|  |  | Tetraheptylammonium iodide | — | — | — | — | — |
|  |  | Tetrabutylammonium triiodide | — | — | — | — | — |
|  | Bromine compound | Tetrabutylammonium bromide | — | — | — | — | — |
|  |  | Isopropylamine hydrobromide | — | — | — | — | — |
|  | Thixotropic agent | Ethylene bis hydroxy stearic acid amide | 3 | 3 | 3 | 3 | 3 |
|  | Imidazoline compound | 2-Phenylimidazoline | 1.5 | 1.5 | 1.5 | 1.5 | 1.5 |
|  | Imidazole compound | 1-Benzyl-2-Phenylimidazole | 1.5 | 1.5 | 1.5 | 1.5 | 1.5 |
|  | Organic solvent | Hexyl carbitol | 30.24 | 30.24 | 29.67 | 29.67 | 29.48 |
|  | Total amount |  | 100 | 100 | 100 | 100 | 100 |
| Iodine content(ppm) |  |  | 893 | 893 | 2851 | 2851 | 3504 |
| Evaluation | Solder wettability (5-point scale) |  | 3 | 4 | 4 | 5 | 5 |
|  | Occurrence of whiskers (presence or absence) |  | Good | Good | Good | Good | Good |
|  | Rate of occurrence of void |  | Good | Good | Good | Good | Good |
|  | Wettability during continuous use |  | Good | Good | Good | Good | Good |
|  | Stability during continuous use (5-point scale) |  | 5 | 5 | 3 | 3 | 3 |

TABLE 2

|  |  |  | Comp. Ex. 1 | Comp. Ex. 2 | Comp. Ex. 3 | Comp. Ex. 4 | Comp. Ex. 5 | Comp. Ex. 7 | Comp. Ex. 6 | Comp. Ex. 8 |
|---|---|---|---|---|---|---|---|---|---|---|
| Formulation (parts by mass) | Base resin | Acrylic resin | 35 | 35 | 35 | 35 | 40 | 35 | 40 | 40 |
|  |  | Rosin-based resin | 10 | 10 | 10 | 10 | 8.5 | 10 | 8.5 | 5 |
|  | Dicarboxylic acid | Glutaric acid(C5) | 5 | 5 | 5 | 5 | — | 5 | — | 3 |
|  |  | Suberic acid(C8) | 1.5 | 1.5 | 1.5 | 1.5 | — | 1.5 | — | 1.5 |
|  |  | Dimer acid(C36) | 12 | 12 | 12 | 12 | — | 12 | 5 | 11.5 |
|  |  | Dodecanedioic acid(C12) | — | — | — | — | 5 | — | — | — |
|  | Quaternary ammonium iodine salt | Tetrabutylammonium iodide | 0 | — | — | 2.62 | 1.25 | 1.25 | 1.25 | — |
|  |  | Tetraheptylammonium iodide | — | — | — | — | — | — | — | — |
|  |  | Tetrabutylammonium triiodide | — | — | — | — | — | — | — | — |
|  | Bromine compound | Tetrabutylammonium bromide | — | 0.36 | — | — | — | — | — | — |
|  |  | Isopropylamine hydrobromide | — | — | 0.59 | — | — | — | — | — |
|  | Thixotropic agent | Ethylene bis hydroxy stearic acid amide | 3 | 3 | 3 | 3 | 3 | 3 | 3 | 5.5 |
|  | Imidazoline compound | 2-Phenylimidazoline | 1.5 | 1.5 | 1.5 | 1.5 | 1.5 | 1.5 | 1.5 | 1.5 |
|  | Imidazole compound | 1-Benzyl-2-Phenylimidazole | 1.5 | 1.5 | 1.5 | 1.5 | 1.5 | 1.5 | 1.5 | 1.5 |
|  | Organic solvent | Hexyl carbitol | 30.5 | 30.14 | 29.91 | 27.88 | 39.25 | 29.25 | 39.25 | 30.5 |
|  | Total amount |  | 100 | 100 | 100 | 100 | 100 | 100 | 100 | 100 |
| Iodine content(ppm) |  |  | 0 | 0 | 0 | 9001 | 4294 | 4294 | 4294 | 0 |
| Evaluation | Solder wettability (5-point scale) |  | 2 | 2 | 2 | 5 | 4 | 5 | 4 | 2 |
|  | Occurrence of whiskers (presence or absence) |  | Good | Bad | Good | Bad | Good | Good | Good | Good |
|  | Rate of occurrence of void |  | Good | Good | Good | Good | Bad | Good | Bad | Good |
|  | Wettability during continuous use |  | Good | Good | Good | Bad | Bad | Bad | Bad | Good |
|  | Stability during continuous use (5-point scale) |  | 5 | Good | Good | 1 | 2 | 2 | 2 | 5 |

TABLE 3

|  |  |  | Example6 | Example7 | Example8 | Example9 | Example10 |
|---|---|---|---|---|---|---|---|
| Formulation (parts by mass) | Base resin | Acrylic resin | 40 | 40 | 40 | 40 | 40 |
|  |  | Rosin-based resin | 5 | 5 | 5 | 5 | 5 |
|  | Dicarboxylic acid | Glutaric acid(C5) | 3 | 3 | 3 | 3 | 3 |
|  |  | Suberic acid(C8) | 1.5 | 1.5 | 1.5 | 1.5 | 1.5 |
|  |  | Dimer acid(C36) | 11.5 | 11.5 | 11.5 | 11.5 | 11.5 |
|  |  | Dodecanedioic acid(C12) | — | — | — | — | — |
|  | Quaternary ammonium iodine salt | Tetrabutylammonium iodide | 0.17 | 0.26 | 0.35 | 0.36 | 0.65 |
|  |  | Tetraheptylammonium iodide | — | — | — | — | — |
|  |  | Tetrabutylammonium triiodide | — | — | — | — | — |
|  | Bromine compound | Tetrabutylammonium bromide | — | — | — | — | — |
|  |  | Isopropylamine hydrobromide | — | — | — | — | — |

TABLE 3-continued

|  |  |  | Example6 | Example7 | Example8 | Example9 | Example10 |
|---|---|---|---|---|---|---|---|
|  | Thixotropic agent | Ethylene bis hydroxy stearic acid amide | 5.5 | 5.5 | 5.5 | 5.5 | 5.5 |
|  | Imidazoline compound | 2-Phenylimidazoline | 1.5 | 1.5 | 1.5 | 1.5 | 1.5 |
|  | Imidazole compound | 1-Benzyl-2-Phenylimidazole | 1.5 | 1.5 | 1.5 | 1.5 | 1.5 |
|  | Organic solvent | Hexyl carbitol | 30.33 | 30.24 | 30.15 | 30.14 | 29.85 |
|  | Total amount |  | 100 | 100 | 100 | 100 | 100 |
| Iodine content(ppm) |  |  | 584 | 893 | 1202 | 1237 | 2233 |
| Evaluation | Solder wettability (5-point scale) |  | 3 | 4 | 4 | 4 | 4 |
|  | Occurrence of whiskers (presence or absence) |  | Good | Good | Good | Good | Good |
|  | Rate of occurrence of void |  | Good | Good | Good | Good | Good |
|  | Wettability during continuous use |  | Good | Good | Good | Good | Good |
|  | Stability during continuous use (5-point scale) |  | 5 | 5 | 5 | 4 | 4 |

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The flux and solder paste of the present invention are suitably used to produce electronic circuit boards in various industries. The electronic circuit board of the present invention is suitably used in various industries.

The invention claimed is:

1. A flux used for soldering with a tin-silver-copper alloy, the flux comprising:
   an imidazole compound and/or an imidazoline compound;
   a dicarboxylic acid having 3 or more and 36 or less carbons; and
   a quaternary ammonium iodine salt;
   wherein relative to the total amount of the flux;
   the dicarboxylic acid content is 6 mass % or more and 25 mass % or less, and
   an iodine content is 200 ppm or more and 3600 ppm or less.

2. The flux according to claim 1, wherein the imidazole compound includes an imidazole compound having 2 or more aromatic rings.

3. The flux according to claim 1, wherein the imidazoline compound includes an imidazoline compound having 1 or more aromatic ring(s).

4. The flux according to claim 1, wherein, relative to the total amount of the flux, the iodine content is 200 ppm or more and 2600 ppm or less.

5. The flux according to claim 1, wherein, relative to the total amount of the flux, the iodine content is 600 ppm or more and 1230 ppm or less.

6. The flux according to claim 1, wherein the dicarboxylic acid includes a dicarboxylic acid having 3 or more and 25 or less carbons and a dicarboxylic acid having 30 or more and 36 or less carbons, and relative to a total amount of the dicarboxylic acids, a ratio of the dicarboxylic acid having 30 or more and 36 or less carbons exceeds 50 mass %.

7. The flux according to claim 1, wherein the dicarboxylic acid includes a dicarboxylic acid having 10 or more and 25 or less carbons and a dicarboxylic acid having 30 or more and 36 or less carbons, and
   relative to a total amount of the dicarboxylic acids, a ratio of the dicarboxylic acid having 30 or more and 36 or less carbons exceeds 50 mass %.

8. A solder paste comprising:
   the flux according to claim 1; and
   a solder powder made of an tin-silver-copper solder alloy, wherein
   the tin-silver-copper solder alloy contains bismuth and antimony,
   relative to a total amount of the tin-silver-copper solder alloy,
   the bismuth content is 2.5 mass % or more, and
   the antimony content is 2.5 mass % or more.

9. The solder paste according to claim 8, wherein the tin-silver-copper solder alloy consists of tin, silver, copper, bismuth, antimony, nickel, cobalt, and inevitable impurities, wherein:
   relative to a total amount of the tin-silver-copper solder alloy,
   the silver content is 2.8 mass % or more and 4 mass % or less,
   the copper content is 0.4 mass % or more and 0.8 mass % or less,
   the antimony content is 2.5 mass % or more and 7 mass % or less,
   the bismuth content is 2.5 mass % or more and 5.5 mass % or less,
   the nickel content is 0.01 mass % or more and 0.2 mass % or less, and
   the cobalt content is 0.001 mass % or more and 0.1 mass % or less.

10. An electronic circuit board comprising a solder portion soldered with the solder paste according to claim 8.

* * * * *